Patented Dec. 18, 1945

2,391,261

UNITED STATES PATENT OFFICE 2,391,261

CATALYTIC REACTIONS

Charles R. Milone, Akron, Ohio, assignor to Wingfoot Corporation, Akron, Ohio, a corporation of Delaware No Drawing. Application August 25, 1942, Serial No. 456,090

6 Claims. (Cl. 260—342.6)

This invention relates to the conversion of maleic anhydride to a monohalo maleic anhydride, such as monochloro maleic anhydride or monobromo maleic anhydride. It has been found that when a molten mixture of a catalyst and maleic anhydride is halogenated, dihalo succinic anhydride is formed and that this can be converted to the halo maleic anhydride by dehydrohalogenation. The invention will be explained in connection with the production of the chloro derivative.

It has been found, for example, that if a few per cent of aluminum chloride or ferric chloride, such as 1 per cent up to about 5 per cent, is added to molten maleic anhydride and chlorine gas is passed into the reaction mixture, the maleic anhydride is converted to dichloro succinic anhydride, and by dehydrochlorination chloro maleic anhydride is formed. The metal chlorides catalyze the chlorination and also the dehydrochlorination. The chlorination may first be carried out at a lower temperature, and the dehydrochlorination follows at a higher temperature; or by using an intermediate or higher temperature both reactions can be made to go forward simultaneously.

It has now been found that certain catalysts which do not aid in the halogenation accelerate the dehydrohalogenation. They increase the rate of production of the monohalo maleic anhydride from the dihalo succinic anhydride, and the loss of hydrogen halide from the dihalo succinic anhydride takes place at a lower temperature, and the reactions are apparently more selective in that fewer by-products are formed. The by-products may include trihalo succinic anhydride produced by halogenation of monohalo maleic anhydride and also possibly dihalo maleic anhydride produced by dehydrohalogenation of the trihalo succinic anhydride.

The dehydrohalogenating agents which may be used include a variety of materials, for example, the halides of the alkaline earth metals; namely, calcium, barium or strontium chloride; or other halide and anhydrides of organic acids and organic peroxides. The peroxides apparently decompose to form the corresponding anhydride when used. At any rate, these dehydrohalogenating catalysts, when added to molten maleic anhydride without a halogenation catalyst, are quite ineffective in the production of dihalo succinic anhydride. A halogenating catalyst must be present to bring about this step of the process.

In carrying out the conversion of maleic anhydride to monochloro maleic anhydride, for example, a molten mixture is prepared of the maleic anhydride and a chlorinating catalyst, such as for example, aluminum chloride. The dehydrochlorinating catalyst may be added to this mixture at the start of the reaction or it may be added after the chlorination is partially or wholly completed.

If the dehydrochlorinating catalyst is added at the start of the reaction, the advantages of the combination of catalysts over the single catalyst are most apparent. For example, at 140–150° C. the reactions using the dehydrochlorinating catalyst can be completed in approximately one-half of the time required when the aluminum chloride is used alone or the reactions may be carried out in the same length of time at temperatures which are lower by as much as 40 to 50° C. In either case the product obtained is cleaner and distills with less residue than when the single catalyst is used.

The following examples illustrate the invention:

1. A mixture of 306 parts of maleic anhydride, 6 parts of anhydrous barium chloride, and 6 parts of anhydrous aluminum chloride was heated to a temperature of about 140–150° C., and chlorine gas was passed into the reaction mixture with stirring until at the end of about eight hours the gain in weight equaled that calculated for conversion to monochloro maleic anhydride, and the reaction was stopped. On distilling, a good yield of chloro maleic anhydride was obtained with a boiling point of 97–103° C./35 mm. $D_{15°}^{27°}=1.535$.

2. On heating a mixture of 300 parts of maleic anhydride, 9 parts of benzoic anhydride, and 6 parts of anhydrous aluminum chloride to a temperature of 140–150° C. and passing chlorine gas through the molten mixture with vigorous stirring and stopping the reaction when the gain in weight equals that calculated for conversion to monochloro maleic anhydride, a good yield of monochloro maleic anhydride was obtained.

3. Similarly, reacting 300 parts of maleic anhydride, 6 parts of anhydrous aluminum chloride, and 9 parts of phthalic anhydride, a good yield of the monochloro maleic anhydride was obtained.

4. Similarly, a good yield of monochloro maleic anhydride was obtained by chlorinating a mixture of 309 parts of maleic anhydride, 6 parts of anhydrous aluminum chloride, and 15 parts of benzoyl peroxide, and the benzoyl peroxide being added to the other components after they had been heated and brought to a molten condition, thereby apparently converting the peroxide to the anhydride.

5. 4.32 pounds (20 mols) of maleic anhydride and 40 grams anhydrous AlCl₃ were heated at 90–100° C. for about 19½ hours, under which conditions the predominant reaction is the addition of chlorine with substantially no liberation of HCl. At the end of this time the gain in weight was 1.79 pounds. At this point 40 grams BaCl₂ were added at a temperature of 85–95° C. There was a vigorous evolution of HCl, and in two and one-half to three hours the loss in weight was somewhat over one-half a pound. The chlorine content of the product had dropped below one mol so additional chlorine was passed into the reaction mixture. A high yield of mono chloro maleic anhydride was obtained.

In all of these reactions it will be found that the dehydrochlorination to monochloro maleic anhydride is accelerated by the presence of a dehydrochlorinating catalyst, and it will be further found that the dehydrochlorination may be carried out at a lower temperature than if such a catalyst is not present. For example, in the presence of dehydrochlorinating catalysts, such as those mentioned here, the dehydrochlorination may be carried out at temperatures as low as 90° C.

What I claim is:

1. The method of converting maleic anhydride to monochloro maleic anhydride which comprises chlorinating molten maleic anhydride which contains a chlorinating catalyst and a dehydrochlorinating catalyst which is not a chlorination catalyst, to simultaneously produce dichloro succinic anhydride from the maleic anhydride and monochloro maleic anhydride from the dichloro succinic anhydride.

2. The method of converting maleic anhydride to monochloro maleic anhydride which comprises chlorinating molten maleic anhydride which contains aluminum chloride and barium chloride.

3. The method of converting maleic anhydride to monochloro maleic anhydride which comprises chlorinating molten maleic anhydride which contains aluminum chloride and the halide of an alkaline earth metal.

4. The method of dehydrochlorinating dichloro succinic anhydride to produce monochloro maleic anhydride which comprises heating dichloro succinic anhydride in the presence of the halide of an alkaline earth metal.

5. The method of dehydrochlorinating dichloro succinic anhydride to produce monochloro maleic anhydride which comprises heating the dichloro succinic anhydride in the presence of barium chloride.

6. The method of converting maleic anhydride to monochloromaleic anhydride which comprises chlorinating molten maleic anhydride which contains a chlorination catalyst and a halide of an alkaline earth metal.

CHARLES R. MILONE.